A. ESSIG.
BROODER.
APPLICATION FILED APR. 5, 1915.

1,169,071. Patented Jan. 18, 1916.

Witnesses
Geo. E. Kricker.

Inventor
A. Essig.
Attorney

UNITED STATES PATENT OFFICE.

ANDREW ESSIG, OF CLEVELAND, OHIO.

BROODER.

1,169,071.

Specification of Letters Patent.     Patented Jan. 18, 1916.

Application filed April 5, 1915.   Serial No. 19,132.

*To all whom it may concern:*

Be it known that I, ANDREW ESSIG, a citizen of the United States, residing at Cleveland, in the county of Cuyahoga and State of Ohio, have invented certain new and useful Improvements in Brooders, of which the following is a specification.

My invention relates to improvements in brooders for chicks hatched from incubators, the present embodiment relating more particularly to that class or type known as "hot air" brooders.

The improved brooder is particularly designed and adapted to be warmed by top heat or hot air exclusively, such heat or hot air being formed in an improved overhanging heat receiving and distributing chamber, said chamber being particularly adapted to uniformly maintain and distribute such top heat or air at any proper or desired temperature within the subjacent brooder chamber, and a further object is an improved brooder of this class which will provide for a proper circulation of pure air at all times without injurious drafts or uneven temperature, and also without any danger of the odors or fumes arising from the heater or lamp entering the brooder chamber.

A still further object is the provision of a generally improved brooder of this class which will be exceedingly simple in construction, cheap of manufacture, efficient in use, as well as one better adapted to the intended and required purposes of such devices.

A still further object is the provision of an improved lamp or combustion chamber, as well as an improved brooder chamber permitting the chicks to pass to and from at will.

With the above mentioned and other ends in view, the invention consists in the novel construction, arrangement, and combination of parts, hereinafter described, illustrated in one of its embodiments in the accompanying drawings, and particularly pointed out in the appended claims.

Figure 1:
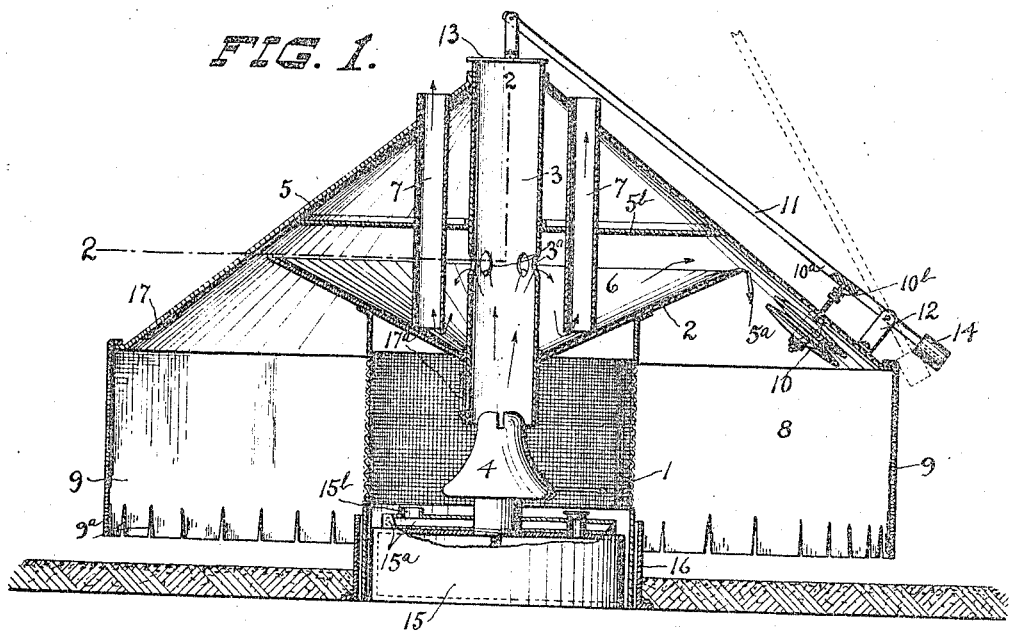
Figure 2:
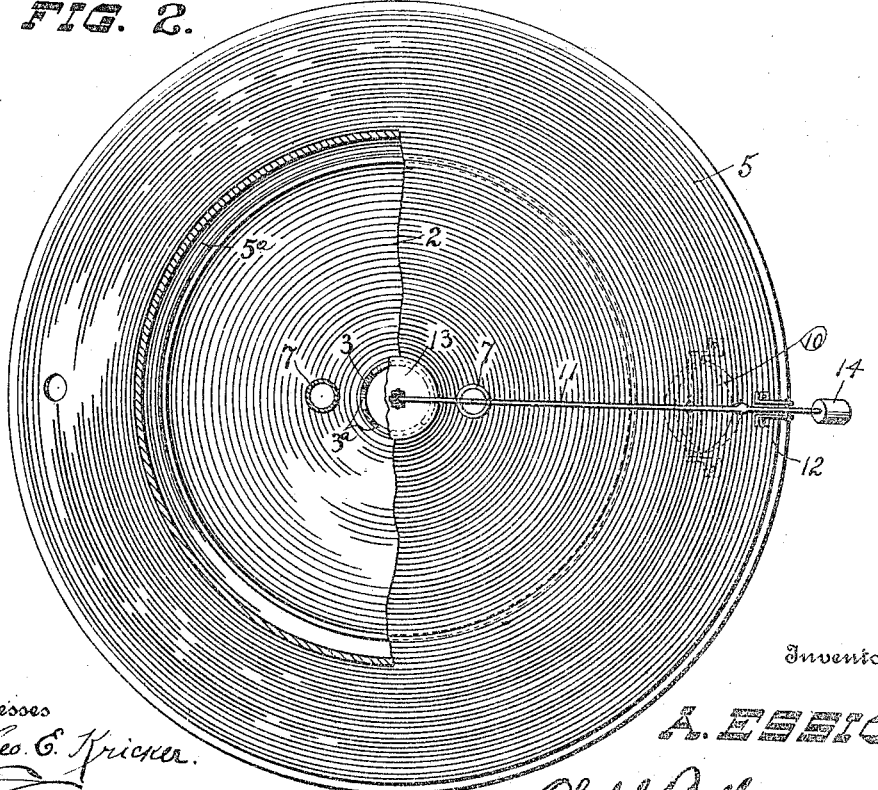

Referring to the drawings forming a part of this specification, Figure 1, is a central vertical sectional view of a brooder constructed in accordance with this invention. Fig. 2, a view partly in top plan, and partly in section, the section being taken on line 2—2 of Fig. 1.

Similar numerals of reference designate like parts throughout all the figures of the drawings.

The improved brooder comprises a central foraminous compartment forming the lamp or combustion chamber 1, said lamp or combustion chamber being provided with an overhanging inverted conical shaped head 2, the latter being provided at its central or apex portion with a tubular flue 3, leading from the lamp or combustion chamber and being adapted to receive the heat from the flame of the heater or lamp burner 4, as shown.

As a means of forming an improved overhanging heat receiving and distributing chamber for distributing the heat or hot air from above the brooder chamber as hereinafter described, the tubular flue or hot air conduit 3, is provided with a conical shaped head or hover 5, forming the top or cover of the brooder proper, said conical shaped head or hover 5, being spaced slightly above and beyond the outer edges of the head 2, and extending downwardly beyond the latter forming an intermediate hot air distributing annular space leading from the hot air receiving and distributing chamber 6. The head or hover 5, is preferably provided with a horizontal plate or wall $5^b$, extending substantially parallel with the horizontal plane of the head 2, and it will be observed that the conical shaped head or hover 5, and plate or wall $5^b$, form conjointly with the inverted conical shaped head 2, the hot air receiving and distributing chamber 6, and as a means of distributing the hot air from the tubular flue or conduit 3 into the upper central portion of the chamber 6, said flue or conduit is provided with outlet openings or ports $3^a$.

As a means of ventilating the heat chamber 6, as well as carrying off any fumes of combustion, the dome-head 5, is provided with a pair of ventilating tubes 7, arranged on opposite sides of the flue or conduit 3, and leading to the central bottom portion of the heat receiving and distributing chamber 6.

As a means of forming an annular brooder chamber 8, immediately beneath the annular heat distributing space $5^a$, leading from the hot air receiving and distributing chamber 6, above, the outer periphery of the dome-shaped head or hover 5, is provided with an outer depending skirted portion 9, said depending wall or skirt 9, being preferably formed of cloth such as cotton flannel, or the like, having its lower edges split as at 9ª, so as to readily permit of the ingress and egress of the chicks to and from the brooder chamber 8, at will.

As a means of regulating the temperature of the air within the brooder chamber 8, a suitable thermostat 10, is mounted beneath one side of the head or hover 5, said thermostat being provided with a threaded stem 10ª, provided at its outer end with a threaded adjusting member 10ᵇ, adapted to bear against a pivoted valve lever 11, said lever being suitably mounted in a bearing bracket 12, the top end of the lever or pivoted bar 11, being provided with a pivoted valve disk 13, adapted to open and close the top portion of the tubular flue or conduit 3, and to play or move about the latter with the action of the thermostat 10, and its threaded stem 10ª, said valve disk, being also adapted to be counterbalanced by means of counterweight 14, at the lower end of the valve lever; said weight being adapted to be adjustably mounted whereby to regulate the sensitiveness of the lever 11, and valve or flue cover 13.

As a convenient means of mounting the lamp 15, within the brooder, the ground or floor upon which the brooder is to be mounted is preferably provided with a protecting ring or base 16, adapted to receive and contain the lower end or base portion of the central compartment forming the lamp or combustion chamber 1, the lamp 15, being first placed centrally within the ring or base flange 16; and the latter being suitably placed for this purpose, and as a suitable means of looking into the brooder chamber, as well as observing the flame at the lamp burner 4, suitable peep-holes 17, and 17ª, may be provided within the wall of the head or dome 5, and the lower portion of the flue 3, respectively.

As a convenient means of cooling the lamp body and burner neck portions of the lamp 15, the latter may be provided at its top with a suitable water receiving reservoir or top jacket 15ª, provided with a suitable opening 15ᵇ, to receive and contain water as shown.

From the foregoing description, taken in connection with the accompanying drawings, the operation and advantages of my invention will be readily understood.

Having thus described one of the embodiments of my invention, what I claim and desire to secure by Letters Patent, is,—

1. In a brooder, the combination with a conical shaped hover provided with a centrally located hot air flue and an inverted conical shaped member carried by said flue forming a hot air receiving and distributing chamber, said hover being spaced from the outer periphery of said inverted conical shaped member forming an annular hot air distributing space leading from said chamber and provided with adjustably mounted counterbalanced thermostatic valve mechanism adapted to automatically regulate the air passing through said hot air flue.

2. In a brooder, a tubular hot air flue provided with outlet ports and carrying a pair of oppositely arranged spaced conical shaped members forming an intermediate hot air receiving and distributing chamber, the upper one of said conical shaped members forming a hover provided with a depending flexible skirt forming a brooder chamber beneath said hot air receiving and distributing chamber, ventilating flues extending through said hover and into the lower portion of said hot air receiving and distributing chamber, a thermostat within said brooder chamber, and valve mechanism operatively connected with said thermostat and adapted to open and close said hot air flue.

3. In a brooder, a central foraminous lamp receiving compartment terminating at its top in an inverted conical shaped head, said head being provided at its apex portion with a tubular hot air conduit provided with outlet ports adapted to discharge above said inverted conical shaped head and carrying a conical shaped hover extending above and spaced from the outer periphery of said head and provided with a depending skirt, said hover forming conjointly with said head a hot air receiving and distributing chamber having an annular distributing space about its outer periphery and said skirt forming conjointly with said lamp receiving compartment a brooder chamber adapted to receive hot air from above as discharged through said annular distributing space.

4. In a brooder, a central lamp receiving compartment provided with a hot air flue, said hot air flue being provided with spaced conical shaped members forming a communicating hot air receiving and distributing chamber, one of said conical shaped members extending outwardly above the other forming a hover and being provided with a depending flexible skirt forming an annular brooder chamber about said lamp receiving compartment and beneath said hot air receiving and distributing chamber, a thermostat carried by said hover within said brooder chamber and provided with an adjustable actuating stem, a counterbalanced valve lever mounted outside of said hover in coöperative relation to said adjustable actuating stem, and a valve carried by said valve lever above said hot air flue and adapted to open and close the same.

5. A brooder, comprising a central lamp receiving foraminous compartment provided with an overhanging inverted cone shaped head, a tubular flue carried by said cone shaped head and communicating with said lamp receiving compartment, a conical shaped hover carried by said tubular flue shaped above and projecting beyond said inverted conical shaped head and forming conjointly therewith a heater chamber, said tubular flue being provided with openings leading to said heater chamber, and said hover being provided with ventilating flues leading to the central bottom portion of said heater chamber, an outer skirted portion carried by said hover and forming an annular brooder chamber surrounding said lamp receiving compartment and receiving hot air from said superposed heater chamber, and a thermostatic valve for opening and closing the top of said tubular flue.

6. A brooder, comprising a central foraminous compartment forming a lamp chamber, an inverted conical shaped head mounted above said compartment and provided with a tubular flue extending through the apex portion of said conical shaped head and projecting into said lamp chamber, a conical shaped hover carried by said tubular flue and spaced from and projecting beyond the outer periphery of said inverted conical shaped head forming conjointly with the latter a hot air receiving and distributing chamber, and an intervening heat distributing annular space, said hover being provided with ventilating flues leading to the lower central portion of said hot air receiving and distributing chamber and provided about its outer periphery with a depending skirted portion forming an annular brooder chamber surrounding said lamp chamber and beneath said hot air receiving and distributing chamber, a thermostat arranged within said brooder chamber, and valve mechanism operatively connected with said thermostat adapted to open and close said tubular flue.

7. In a brooder, a central lamp receiving foraminous compartment provided with oppositely extending cone shaped members forming a hot air receiving and distributing chamber, said cone shaped members having their apex portions provided with and connected by a tubular hot air flue extending into said lamp receiving compartment and provided with hot air outlet ports communicating with said chamber, one of said conical shaped members forming a hover spaced from and extending outwardly over the other of said conical shaped members forming an annular hot air distributing space leading from said chamber, a flexible skirt carried by said hover and forming an annular brooder chamber surrounding said lamp receiving compartment and spaced directly beneath said hot air distributing annular space, vertically extending ventilating flues arranged on opposite sides of said hot air flue and communicating with the lower central portions of said hot air receiving and distributing chamber, a thermostat carried by said hover within said brooder chamber, and counterbalanced valve mechanism carried on the outside of said hover in adjustable relation to said thermostat and adapted to open and close said hot air flue.

In testimony whereof I have affixed my signature in presence of two witnesses.

ANDREW ESSIG.

Witnesses:
 GEO. E. KRICKER,
 F. C. ADAMS.